US007557462B2

(12) United States Patent
Shie

(10) Patent No.: US 7,557,462 B2
(45) Date of Patent: Jul. 7, 2009

(54) LIGHT EMITTING DIODE FLEXIBLE PRINTED CIRCUIT HAVING A SWITCHING UNIT FOR SWITCHING BETWEEN A SERIES MODE AND A PARALLEL MODE

(75) Inventor: De-Ching Shie, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 277 days.

(21) Appl. No.: 11/522,748

(22) Filed: Sep. 18, 2006

(65) Prior Publication Data

US 2007/0064416 A1 Mar. 22, 2007

(30) Foreign Application Priority Data

Sep. 16, 2005 (TW) .............................. 94132093 A

(51) Int. Cl.
*H02J 3/14* (2006.01)

(52) U.S. Cl. .......................... 307/37; 307/113; 362/227

(58) Field of Classification Search .................. 307/37, 307/113, 141.8; 362/227, 659; 315/191-193, 315/122, 185 R
See application file for complete search history.

(56) References Cited

U.S. PATENT DOCUMENTS 4,160,934 A 7/1979 Kirsch
2005/0243022 A1 * 11/2005 Negru ......................... 345/46

* cited by examiner

*Primary Examiner*—Albert W Paladini
*Assistant Examiner*—Carlos Amaya
(74) *Attorney, Agent, or Firm*—Wei Te Chung

(57) ABSTRACT

An exemplary light emitting diode flexible printed circuit (100) includes four light emitting diodes (110); three switching units (117) interconnecting the four light emitting diodes; a first lead (113) and four second leads (115). The first lead connects with the switching unit, all but one of the four second leads connect with the switching unit, and one of the four second leads connects with one of the light emitting diodes. The switching units are configured for switching the four light emitting diodes between a series connection state and a parallel connection state.

6 Claims, 2 Drawing Sheets

LIGHT EMITTING DIODE FLEXIBLE PRINTED CIRCUIT HAVING A SWITCHING UNIT FOR SWITCHING BETWEEN A SERIES MODE AND A PARALLEL MODE

FIELD OF THE INVENTION

The present invention relates to flexible printed circuits, and particularly to a flexible printed circuit having a plurality of light emitting diodes (LEDs) disposed thereon, wherein an operation mode of the light emitting diodes can be switched.

BACKGROUND

A liquid crystal display device is widely used in products such as notebook computers and portable TVs. The liquid crystal display device generally includes a liquid crystal panel, and a backlight system to provide uniform collimated light to the liquid crystal panel. The backlight system mainly includes a light source and a light guide plate. A light emitting diode is widely used as the light source in the backlight system, due to its lower power consumption and high brightness. In a typical backlight system, a plurality of light emitting diodes is fixed on a flexible printed circuit and positioned adjacent the light guide plate.

At present, an operation mode of the flexible printed circuit with the light emitting diodes is normally one of two types: a series operation mode or a parallel operation mode. The type of operation mode is determined according to the requirements of the driving circuit of the light emitting diodes.

Referring to FIG. 3, one kind of light emitting diode flexible printed circuit 10 includes a plurality of light emitting diodes 11 and a plurality of first leads 13. The first leads 13 electrically interconnect the light emitting diodes 11 in turn such that make the light emitting diodes 11 are connected in series. An end one of the first leads 13 is electrically connected to a driving circuit (not shown) for providing driving voltage. Referring to FIG. 4, another kind of light emitting diode flexible printed circuit 20 includes a plurality of light emitting diodes 21, a second lead 23, and a plurality of third leads 25. The light emitting diodes 21 are interconnected in parallel between the second lead 23 and the third leads 25. The second lead 23 and the third leads 25 are connected to a driving circuit (not shown) for providing driving voltage.

The LED flexible printed circuit 10 that operates in series mode has a higher efficiency in utilization of electrical power, but is liable to be disturbed by electromagnetic interference (EMI). The LED flexible printed circuit 20 that operates in parallel mode has greater stability, but has a lower efficiency in utilization of electrical power. In some products, the backlight module employing a light emitting diode flexible printed circuit needs to be able to operate in either of the two modes, depending on the final destination of the product and the eventual end use of the product. For such products, it is commonplace to provide two sets of light emitting diodes with different operation modes on the one same flexible printed circuit. The designing and manufacturing of this kind of "hybrid" flexible printed circuit is troublesome, time-consuming, and costly.

Accordingly, what is needed is a light emitting diode flexible printed circuit that can overcome the above-described deficiencies.

SUMMARY

An exemplary light emitting diode flexible printed circuit includes four light emitting diodes; three switching units interconnecting the four light emitting diodes; a first lead and four second leads. The first lead connects with the switching unit, all but one of the four second leads connect with the switching unit, and one of the four second leads connects with one of the light emitting diodes. The switching units are configured for switching the four light emitting diodes between a series connection state and a parallel connection state.

Other advantages and novel features will become more apparent from the following detailed description of preferred embodiments when taken in conjunction with the accompanying drawings. In the drawings, all the diagrams are schematic.

DETAILED DESCRIPTION OF PREFERRED EMBODIMENTS

Reference will now be made to the drawings to describe preferred embodiments of the present invention in detail.

Figure 1:
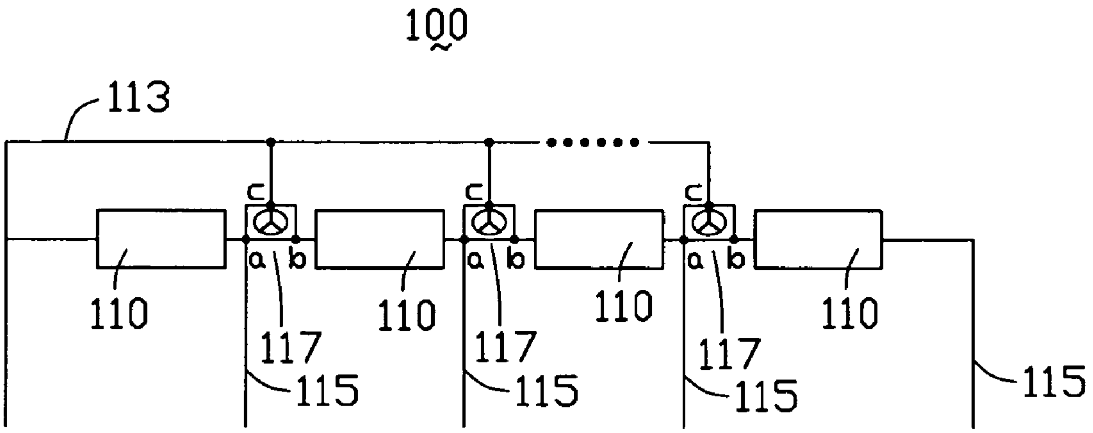
FIG. 1 is an abbreviated diagram of a light emitting diode flexible printed circuit according to a first embodiment of the present invention.

FIG. 1 is an abbreviated diagram of a light emitting diode flexible printed circuit according to a first embodiment of the present invention. The light emitting diode flexible printed circuit 100 includes a plurality of light emitting diodes 110, a first lead 113, a plurality of second leads 115, and a switching unit (not labeled) having a plurality of switches 117.

Each of the switches 117 is a turn switch, and includes a first terminal 'a', a common terminal 'b', and a second terminal 'c'. The illustrated embodiment shows four light emitting diodes 110 and three switches 117 as an example. Each of the switches 117 is disposed between two corresponding adjacent light emitting diodes 110. Each second terminal 'c' is connected to the first lead 113, each first terminal 'a' is connected to an end terminal of a corresponding one of the light emitting diodes 110, and each common terminal 'b' is connected to a beginning terminal of another corresponding one of the light emitting diodes 110. The beginning terminal of a first one of the light emitting diodes 110 (at the left side in FIG. 1) is connected to the first lead 113. The end terminal of each of the light emitting diodes 110 is connected to a corresponding second lead 115. When the light emitting diode flexible printed circuit 100 needs to be configured in series operation mode, the switches 117 are turned. This makes each first terminal 'a' electrically connect to the corresponding common terminal 'b', whereby the light emitting diodes 110 are connected in series. Driving voltage is provided from a beginning terminal of the first lead 113 and from the last one of the second leads 115 (at the right side in FIG. 1). When the light emitting diode flexible printed circuit 100 needs to be configured in parallel operation mode, the switches 117 are turned. This makes each second terminal 'c' electrically connect to the corresponding common terminal 'b', whereby the light emitting diodes 110 are connected in parallel. Driving voltage is provided from the beginning terminal of the first lead 113 and from all of the second leads 115.

Figure 2:
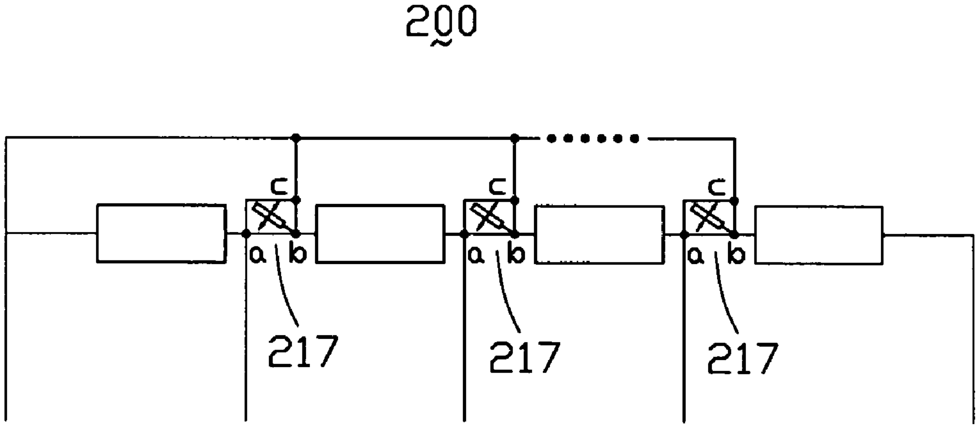
FIG. 2 is an abbreviated diagram of a light emitting diode flexible printed circuit according to a second embodiment of the present invention.
Figure 3:
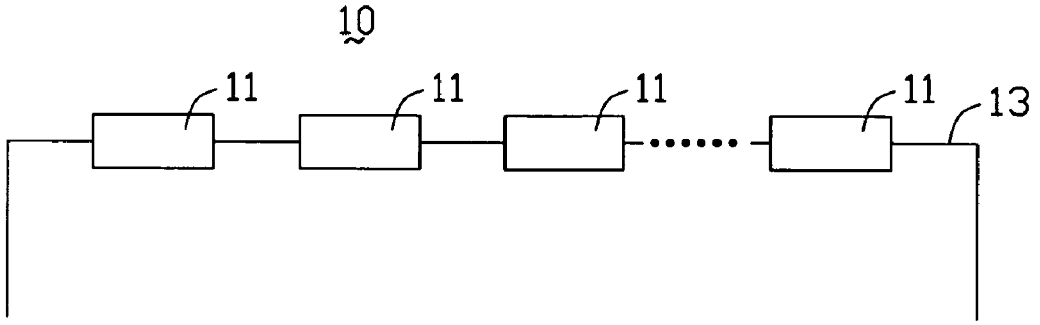
FIG. 3 (RELATED ART)
FIG. 3 is an abbreviated diagram of one kind of conventional light emitting diode flexible printed circuit, in which the light emitting diodes are connected in series.
Figure 4:
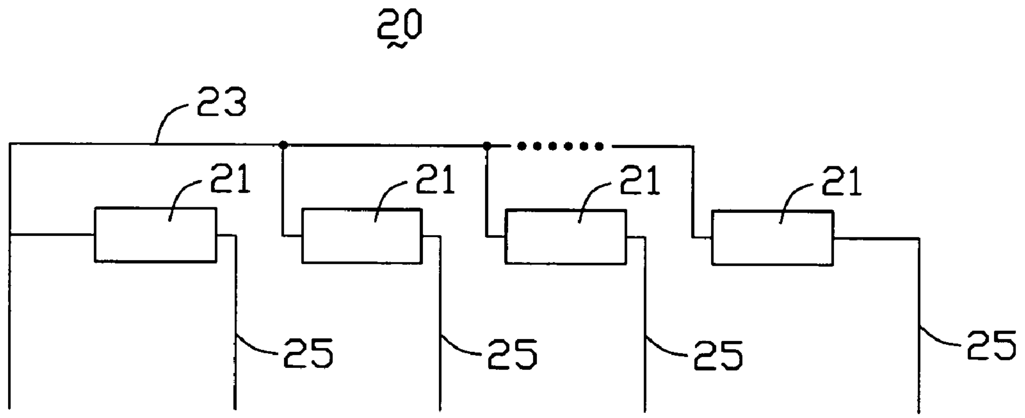
FIG. 4 (RELATED ART)
FIG. 4 is an abbreviated diagram of another kind of conventional light emitting diode flexible printed circuit, in which the light emitting diodes are connected in parallel.

Referring to FIG. 2, this is an abbreviated diagram of a light emitting diode flexible printed circuit according to a second embodiment of the present invention. The light emitting diode flexible printed circuit 200 has a structure similar to that of the light emitting diode flexible printed circuit 100. However, a switching unit (not labeled) of the light emitting diode flexible printed circuit 200 has a plurality of resistance switches 217. Each of the resistance switches 217 is disposed between two corresponding adjacent light emitting diodes (not labeled). The resistance switches 217 can be switched in unison, so that the light emitting diodes are switched between being connected in series and being connected in parallel. Thereby, the desired operation mode of the light emitting diode flexible printed circuit 200 can be configured.

The light emitting diode flexible printed circuits 100, 200 respectively use the turn switches 117 and the resistance switches 217 for switching the corresponding light emitting diodes between a series connection state and a parallel connection state. Accordingly, the desired operation mode of the light emitting diode flexible printed circuit 100, 200 can be configured. Unlike the above-described conventional “hybrid” light emitting diode flexible printed circuit, the light emitting diode flexible printed circuit 100, 200 requires only one set of light emitting diodes. This makes the designing and manufacturing of the light emitting diode flexible printed circuit 100, 200 relatively easy, fast, and inexpensive.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A light emitting diode flexible printed circuit, comprising:

at least two light emitting diodes;

a switching unit interconnecting the at least two light emitting diodes, the switching unit comprising at least one switch, and each of the at least one switch interconnecting two corresponding adjacent of the at least two light emitting diodes, each of the at least one switch comprising a first terminal, a second terminal, and a common terminal; and a first lead and at least two second leads, the first lead connecting with the switching unit, all but one of the at least two second leads connecting with the switching unit, and a last one of the at least two second leads connecting with a last one of the at least two light emitting diodes;

wherein a beginning terminal of a first one of the at least two light emitting diodes is connected to the first lead, and an end terminal of each of the at least two light emitting diodes is connected to a corresponding one of the at least two second leads; and wherein the switching unit is configured for switching the at least two light emitting diodes between a series connection state and a parallel connection state.

2. The light emitting diode flexible printed circuit as claimed in claim 1, wherein each second terminal is connected to the first lead, each first terminal is connected to the end terminal of a corresponding one of the at least two light emitting diodes, and each common terminal is connected to a beginning terminal of another corresponding one of the at least two light emitting diodes.

3. The light emitting diode flexible printed circuit as claimed in claim 2, wherein when the switching unit is switched to provide the series connection state, each of the first terminals electrically connects to a corresponding one of the common terminals.

4. The light emitting diode flexible printed circuit as claimed in claim 3, wherein driving voltage is provided from a beginning terminal of the first lead and from the last one of the at least two second leads.

5. The light emitting diode flexible printed circuit as claimed in claim 2, wherein when the switching unit is switched to provide the parallel connection state, each of the second terminals electrically connects to a corresponding one of the common terminals.

6. The light emitting diode flexible printed circuit as claimed in claim 5, wherein driving voltage is provided from a beginning terminal of the first lead and from all of the at least two second leads.

* * * * *